(12) United States Patent
Binhussain et al.

(10) Patent No.: US 9,776,930 B2
(45) Date of Patent: *Oct. 3, 2017

(54) NANO-POROUS CORUNDUM CERAMICS AND METHODS OF MANUFACTURE

(71) Applicants: King Abdulaziz City for Science and Technology, Riyadh (SA); Fraunhofer-Gesellschaft, München (DE)

(72) Inventors: Mohammed A. Binhussain, Riyadh (SA); Akeel Khalid Alakeel, Riyadh (SA); Majid Mohammed Binmajid, Riyadh (SA); Jens Klimke, Dresden (DE)

(73) Assignees: KING ABDULAZIZ CITY FOR SCIENCE AND TECHNOLOGY, Riyadh (SA); FRAUNHOFER-GESELLSCHAFT, München (DE)

( * ) Notice: Subject to any disclaimer, the term of this patent is extended or adjusted under 35 U.S.C. 154(b) by 354 days.

This patent is subject to a terminal disclaimer.

(21) Appl. No.: 14/470,243

(22) Filed: Aug. 27, 2014

(65) Prior Publication Data
US 2016/0060179 A1     Mar. 3, 2016

(51) Int. Cl.
*C04B 35/111*     (2006.01)
*C04B 38/00*      (2006.01)
(Continued)

(52) U.S. Cl.
CPC ........ *C04B 38/0045* (2013.01); *B28B 11/243* (2013.01); *C04B 35/111* (2013.01);
(Continued)

(58) Field of Classification Search
CPC . C04B 35/111; C04B 35/115; C04B 35/6261; C04B 35/6262; C04B 35/62625–35/6264; C04B 2235/6023
See application file for complete search history.

(56) References Cited

U.S. PATENT DOCUMENTS 6,306,788 B1    10/2001   Watanabe et al.
6,841,497 B1 *  1/2005    Krell ............... B01D 67/0046
                                              423/624

(Continued)

FOREIGN PATENT DOCUMENTS

CN      101306943 A     11/2008
EP        1706365 B1    10/2006
JP      2008137838 A     6/2008

OTHER PUBLICATIONS

Krell et al., "The Influence of Shaping Method on the Grain Size Dependence of Strength in Dense Submicrometre Alumina", Journal of the European Ceramic Society 16, 1996, pp. 1189-1200.*

(Continued)

*Primary Examiner* — Erin Snelting
(74) *Attorney, Agent, or Firm* — Andrew M. Calderon; Roberts Mlotkowski Safran Cole & Calderon, P.C.

(57) ABSTRACT

Nano-porous corundum ceramics and methods of manufacture are disclosed. The method of forming nano-porous corundum ceramics includes milling corundum powder in aqueous slurry with beads. The method further includes processing the slurry by a liquid shaping process to form a gelled body. The method further includes sintering the gelled body between 600° C. to 1000° C.

18 Claims, 5 Drawing Sheets

(51) Int. Cl.
C04B 35/626 (2006.01)
C04B 38/06 (2006.01)
B28B 11/24 (2006.01)

(52) U.S. Cl.
CPC .... C04B 35/6261 (2013.01); C04B 35/62625 (2013.01); C04B 35/62655 (2013.01); C04B 38/0054 (2013.01); C04B 38/0074 (2013.01); C04B 38/062 (2013.01); C04B 2235/3206 (2013.01); C04B 2235/5409 (2013.01); C04B 2235/5445 (2013.01); C04B 2235/6023 (2013.01); C04B 2235/6027 (2013.01); C04B 2235/6562 (2013.01); C04B 2235/6585 (2013.01); C04B 2235/77 (2013.01)

(56) References Cited

U.S. PATENT DOCUMENTS

| 9,527,774 | B2* | 12/2016 | Binhussain | C04B 35/115 |
| 2002/0052288 | A1* | 5/2002 | Krell | C04B 38/00 501/105 |
| 2002/0171363 | A1 | 11/2002 | Scott et al. | |
| 2003/0209541 | A1 | 11/2003 | Cheng et al. | |
| 2005/0164867 | A1 | 7/2005 | Krell et al. | |
| 2005/0248277 | A1 | 11/2005 | Van Bruggen et al. | |
| 2011/0039685 | A1 | 2/2011 | Mao et al. | |

OTHER PUBLICATIONS

Lallemant et al., "Transparent polycrystalline alumina obtained by SPS: Green bodies processing effect", Journal of the European Ceramic Society 32, 2012, pp. 2909-2915.

Krell et al., "Effect of the Homogeneity of Particle Coordination . . . of transparent Alumina", Journal of the American Ceramic Society 89, 2006, pp. 1985-1992.

Apetz et al., "Transparent Alumina: A light-Scattering Model", Journal of the American Ceramic Society, vol. 86, Mar. 2003, pp. 480-486.

Brandes et al., "Gel Casting of Free-Shapeable . . . Pore Size for Ultra- and Microfiltration", Journal of the American Ceramic Society, vol. 97, 2014, No. 5, pp. 1393-1401.

Petit et al., "Sintering of a-alumina for highly transparent ceramic applications", Journal of the European Ceramic Society, vol. 31, 2011, pp. 1957-1963.

Bernard-Granger et al., "Influence of Co-Doping . . . of a submicronic alumina material", Journal of the American Ceramic Society, vol. 91, No. 5, 2008, pp. 1703-1706.

Roussel et al., "Highly dense, Transparent . . . Nanoparticles Via a Standard SPS Sintering", Journal of the American Ceramic Society, vol. 96, No. 4, 2013, pp. 1039-1042.

Kim et al., "Microstructure and optical properties of transparent alumina", Acta Materialia, vol. 57, 2009, pp. 1319-1326.

Janney et al., "Development of Low-Toxicity Gelcasting Systems", Journal of the American Ceramic Society, vol. 81, No. 3, 1998, pp. 581-591.

Grasso et al., "Highly transparent a-alumina obtained by low cost high pressure SPS", Ceramics International, vol. 39, 2013, pp. 3243-3248.

Suárez et al., "Sintering to Transparency of Polycrystalline Ceramic Materials" Sintering to Transparency of Polycrystalline Ceramic Materials, Mar. 2012, pp. 527-552.

* cited by examiner

NANO-POROUS CORUNDUM CERAMICS AND METHODS OF MANUFACTURE

FIELD OF THE INVENTION

The invention relates to ceramics and, more particularly, to nano-porous corundum ceramics and methods of manufacture.

BACKGROUND OF THE INVENTION

Ceramics are very versatile in their industrial use ranging from applications in engine components, frames, etc. The properties of ceramic materials are based on many factors including, for example, the types of atoms, the bonding between the atoms, and the packaging of the atoms. For example, ceramics usually have a combination of ionic and covalent bonds. The covalent bond typically results in high elastic modulus and hardness, high melting points, low thermal expansion, and good chemical resistance.

More specifically, due to ceramic materials wide range of properties, they can exhibit the following characteristics: (i) hard, (ii) wear-resistant, (iii) brittle, (iv) refractory, (v) thermal and electrical insulators, (v) nonmagnetic, (vi) oxidation resistant, (vii) prone to thermal shock, and (viii) chemically stable. Ceramics are thus known to have excellent optical, mechanical, thermal, and chemical properties. In fact, polycrystalline ceramics exhibit extraordinary properties that cannot be reached by glasses due to its high strength. It is a combination of these properties that make ceramics very versatile in their industrial use.

SUMMARY OF THE INVENTION

In an aspect of the invention, a method of forming nano-porous corundum ceramics, comprises milling corundum powder in an aqueous slurry with beads. The method further comprises processing the slurry by a liquid shaping process to form a gelled body. The method further comprises sintering the gelled body between 600° C. to 1000° C.

In an aspect of the invention, a method comprises milling corundum powder with BET of 17-21 m²/g in aqueous slurry with beads. The aqueous slurry is distilled water with MgO precursor for dopant and $HNO_3$ for stabilizing a pH of the corundum powder. The method further comprises processing the aqueous slurry by a liquid shaping process to form a gelled body. The method further comprises sintering the gelled body in air at a temperature between 800° C. to 900° C.

In an aspect of the invention, a nano-porous ceramic body composed of corundum powder having a thickness between 5 mm and 30 mm, porosity between 35% and 40%, <1% of the pore volume with pore size >45 nm and <1% of the pore volume with pore size <20 nm.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to ceramics and, more particularly, to nano-porous corundum ceramics and methods of manufacture. In more specific embodiments, the present invention is directed to nano-porous corundum ceramics with purity more than 99.0% and methods of manufacture. In embodiments, the nano-porous corundum ceramics have a thickness between 5 mm and 30 mm, porosity between 35% and 40%, <1% of the pore volume with pore size >45 nm and <1% of the pore volume with pore size <20 nm. Advantageously, the present invention can be used in many different applications ranging from aircraft and automobile materials to use in building industries and medical applications.

In an exemplary embodiment of the present invention, the corundum ceramics of the present invention can be manufactured, for example, using the following processes:

(i) using corundum powder with BET of 17-21 m²/g;
(ii) milling the powder in an aqueous slurry with beads;
(iii) processing the slurry by a liquid shaping process to form a gelled body; and
(iv) sintering the gelled body in air at a temperature between 800° C.-900° C.

In more specific embodiments, the method for production of the nano-porous corundum ceramics includes the use of corundum powder with a BET of 17-21 m2/g; however, the present invention also contemplates other ranges. For example, the corundum powder can have a BET of 14-24 m²/g. In embodiments, the corundum powder has a purity of >99.9 and preferably 99.995%. In embodiments, the raw powder can be obtained from Taimei Chemicals Co., LTD., Japan, under the trade name of TM-UF. The measurements, e.g., BET of 15-24 m²/g, can be made with an ASAP2020 Physisorption Analyzer, Micromeritics, Norcross, Ga.

Figure 1:
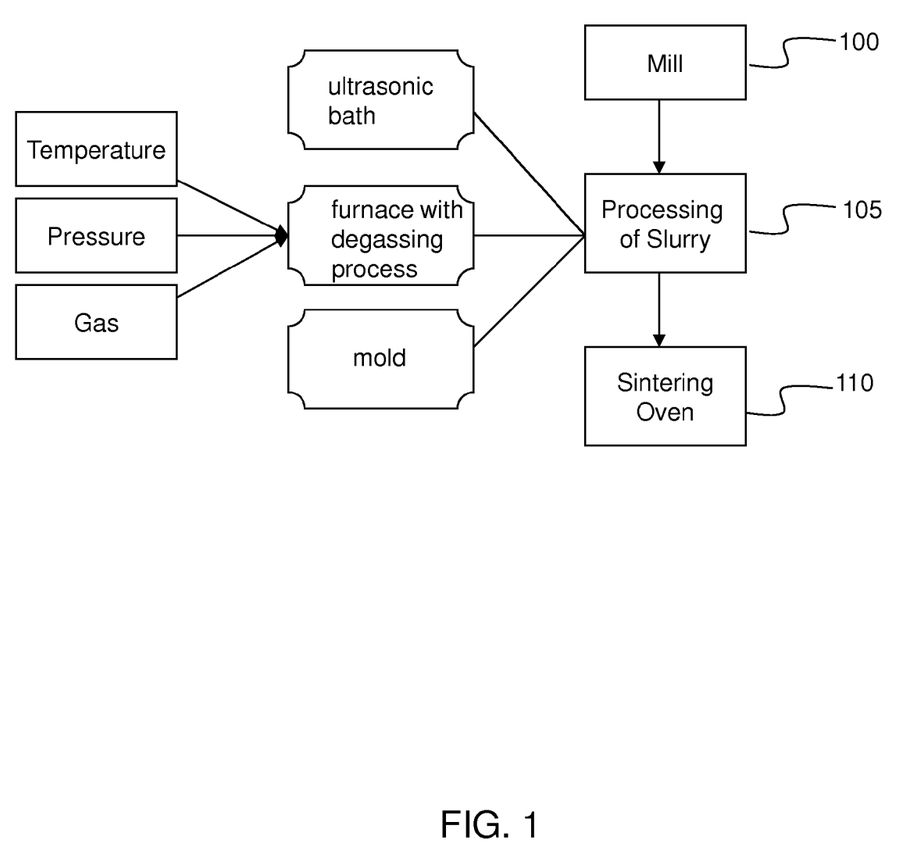
FIG. 1 is representative of a processing flow and related equipment used in accordance with aspects of the present invention.

FIG. 1 is representative of a processing flow and related equipment used in accordance with aspects of the present invention. As shown in FIG. 1, the corundum powder can be milled in aqueous slurry with beads for about 2 hours. For example, the milling can be performed by an attrition mill, e.g., attrition milling processes, as shown representatively at reference numeral 100. In alternative embodiments, the milling can be performed by a tumble or ball mill, vertical roller mill or the like, each of which are represented at reference numeral 100.

A gelling agent can be added after the milling (which may also be suitable to other liquid shaping processes like temperature induced forming or direct coagulation casting). The present invention also contemplates a gelcasting process with monomers (known to those of skill in the art) added to the slurry. After polymerization a rubberlike hydrogel, binding the water, can be formed. The powder particles are embedded in this hydrogel fixing their position. During drying there is a shrinkage and the swelled gelled body becomes inflexible. The particles get narrower together but the position of the particles to one other is still the same.

In one example, the beads can be corundum beads of about 2 mm in diameter; although other sized corundum beads are also contemplated by the present invention. For example, the diameter of the corundum beads can range from about 0.5 mm to about 4 mm. In preferred embodiments, the corundum beads are dense sintered corundum beads with sub-µm grain size. The corundum beads can have a purity of >99.9% and preferably >99.95%. In further embodiments, the beads can be $ZrO_2$ beads with 3 mol % $Y_2O_3$.

In embodiments, the composition of the aqueous slurry comprises distilled water, with MgO precursor for dopant (<0.05 wt % $MgAl_2O_4$) and $HNO_3$ for stabilizing the pH of the corundum powder. In embodiments, a sintering aid of MgO or a MgO precursor comprising <0.05 wt % MgO is added to the slurry. In embodiments, the pH should be about 4. In embodiments, the aqueous slurry can be distilled water and $HNO_3$ for stabilizing a pH of the corundum powder between 3.5 and 4.5. In alternative embodiments, the present invention also contemplates stabilizing with a polymer surrounding the particles at pH between 8-11. In additional embodiments, the MgO sintering aid can be eliminated and stabilization of the particles in the slurry can be accomplished by positive charge from H+ ions from the acid or steric by specific polymers, such as, for example, DOLAPIX or DISPEX.

DOLAPIX is an alkali-free anionic polyelectrolyte (Dolapix CE64) dispersant which is delivered as a 70 wt % aqueous solution and contained 30 wt % of the ammonium salt of polymethacrylic acid (PMAA-NH4). Dispex is a polyacrylate dispersant which is used to disperse inorganic materials. (DOLAPIX is a trademark of DuPont.) In further embodiments, 800 grams of milling beads can be used for 300 gram of slurry; although it should be understood that other amounts and types of milling beads can be used in the present invention, without limitation to the above example. In embodiments, for example, the amount of milling beads can be dependent on the volume and type of mill.

In embodiments, the processing of the slurry can include a liquid shaping process. In embodiments, the processing of the slurry can be performed by a liquid shaping process for about 2 hours in duration. The processing can include different processing techniques as shown representatively at reference numeral 105 of FIG. 1. For example, the corundum powder, e.g., TM-UF raw powder, can be added to the slurry at 500 rpm for 30 minutes, then the slurry can be added to 800 grams of corundum milling beads with particle size 1-2 mm, for about two hours at 1000 rpm.

The liquid shaping process can be one of many different ceramic forming techniques, any of which is shown representatively at reference numeral 105 of FIG. 1. For example, the present invention contemplates a gelcasting process as shown at reference numeral 105; although other liquid shaping techniques are contemplated by the present invention, e.g., "slip casting" or "coagulation casting" each of which are also represented at reference numeral 105.

As should be understood by those of skill in the art, gelcasting is a colloidal processing method with a short forming time, high yields, and low-cost machining, used to prepare high-quality and complex-shaped dense/porous ceramic parts. On the other hand, the present invention also contemplates slipcasting techniques. Slipcasting techniques are known to provide a superior surface quality, and to achieve a higher density and uniformity in casting high-purity ceramic raw materials over other ceramic casting techniques, such as hydraulic casting.

In more specific embodiments, the liquid shaping process of the present invention can be performed with the following tools: ultrasonic bath, furnace with degassing process and a mold (e.g., glass mold) as shown representatively at reference numeral 105. In embodiments, the degassing process starts with placing the slurry molds in a vacuum furnace at 20° C. to 25° C. (room temperature) with vacuuming the air inside the furnace until it reaches about 200 mbar. In embodiments, the present invention contemplates vacuuming air inside until it reaches a vacuum at least 50 mbar above a boiling point of the slurry.

Then nitrogen gas is inserted into the furnace until it reaches 1000 mbar. The nitrogen gas is then vacuumed out of the furnace until it reaches about 200 mbar. In embodiments, the nitrogen gas is vacuumed until it reaches a vacuum at least 50 mbar above the boiling point of the slurry. This process of inserting the nitrogen and vacuuming can be provided two times, preferably. Then after waiting about 20-40 minutes at about 200 mbar, the furnace can be filled with nitrogen gas, again. Then, the temperature for the vacuum furnace is increased to about 40° C. to 80° C., with a preference of about 60° C. for 0.5 to 8.0 hours, with a preference of about 4.0 hours. After that the furnace is reduced to room temperature.

In embodiments, the shaping process results in a gelled body (formed from the mold) which is dried. After drying, organics are burnt out at about 800° C., and the body is sintered in air (using a sintering oven as shown representatively at reference numeral 110 of FIG. 1). In embodiments, the sintering can be performed in oxygen or inert gas or mixtures thereof.

In embodiments, the ceramic body can be dried in air for around 1-14 days, in order to remove any aqueous solution therefrom. In embodiments, the gelled body can also be sintered in air at a temperature between about 800° C. to 900° C.; although other temperature ranges and atmospheres are contemplated by the present invention. For example, an electric furnace for burning out of organics is operated starting from 0.5 Kelvin/min until it reaches 800° C. then its ended after two hours from maximum temperature (e.g., about 600° C. to 1000° C., with a preference of about 800° C. to 900° C. and most preferably at about 800° C.). The atmospheres can be air, oxygen or mixtures of inert gasses with oxygen. In embodiments, the ramp can be between 0.1 K/min. and 2 K/min. depending on the wall thickness of the ceramic body, and the final temperature can be about 600° C. to 1000° C., with a preference of about 800° C.; hold time at final temperature is between about 0 minutes to 10 hours, with a preferred hold time of about 2 hours. In embodiments, the temperature range of the sintering leads in addition to the purity of the constituent components result in the nanoporous ceramic body of the present invention, as noted herein.

In embodiments, the resultant ceramic body can have a thickness of about 0.5 cm to 3.0 cm; although other dimensions are contemplated by the present invention. By way of example, the present invention contemplates any shape with wall thickness between 0.5 cm to 5.0 cm, including hollow bodies and complex structures. In embodiments, the length and width of the ceramic body are only limited by the size of the mold and the size of the furnace. That is, it should be understood that the final thickness (or other dimensions) after shrinkage and drying will depend on the casting height (or dimensions) and other physical properties.

Also, as a result of the processes, the porous ceramic body is homogeneous. Also, the porous ceramic body will be composed of specific pore sizes with specific characteristics. For example, in embodiments, the porous ceramic body has the following characteristics:

(i) porosity between 35% and 40%;
(ii) <1% of the pore volume with pore size >45 nm; and
(iii) <1% of the pore volume with pore size <20 nm.

In further embodiments, the remaining pore size/volume is 1% between 10 nm and 20 nm and 1% between 45 nm and 60 nm. Also, it should now be understood that the different pore size is a result of the specific particle size of the powder (defined by the specific surface area BET), the de-agglomeration process (milling) and the process of forming the ceramic body (liquid shaping). In embodiments, though, it is preferred to have a narrow pore size distribution with pores of same size or a small pore size and no larger pores as further described with regard to the below examples.

Figure 2:
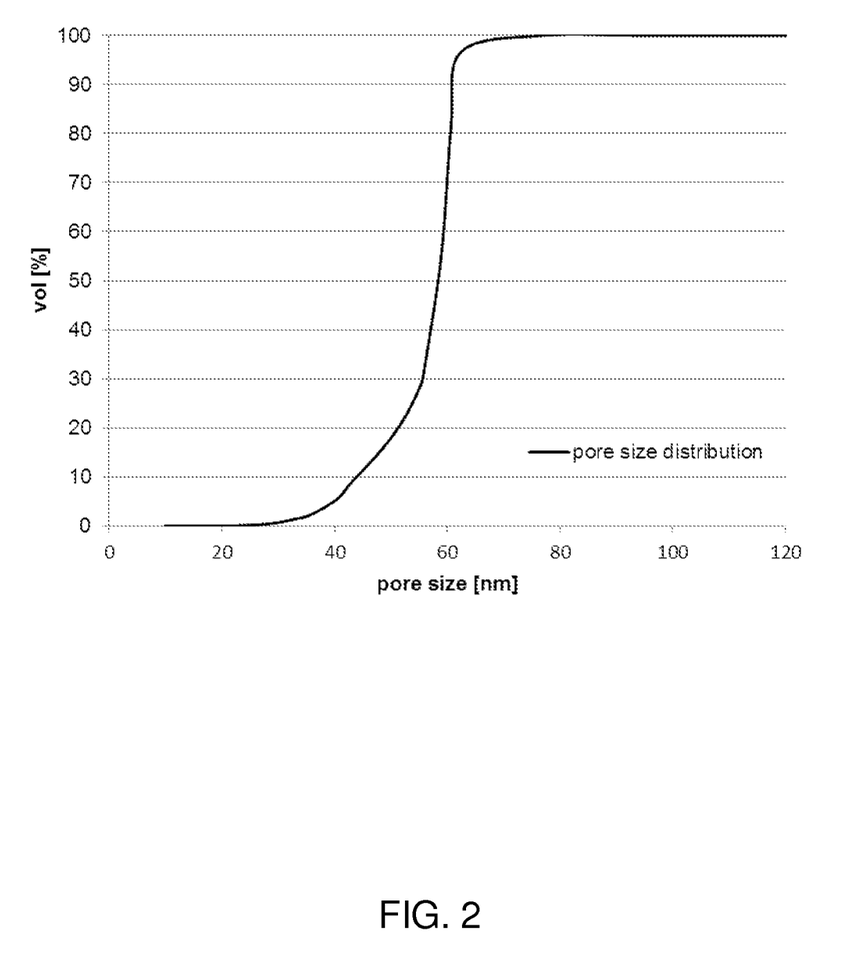
FIG. 2 shows a pore size distribution of nano-porous corundum ceramics prepared with a corundum powder of BET 14.5 m²/g with a liquid shaping process. (The pore size distribution was determined by mercury intrusion method (AutoPore IV 9500, Micromeritics, Norcross, Ga., U.S.A.))

FIG. 2 shows a pore size distribution of corundum ceramics prepared with a liquid shaping process using a high purity corundum powder with BET 14.5 m2/g. The nano porous corundum ceramics of the prior art exhibit the following disadvantages: The median pore size is too high and the pore size distribution is too broad. It is especially important that the larger defects with size between 60-75 nm must be avoided. The task of development therefore of the present invention forms nonporous corundum ceramics with finer pore size and a narrow pore size distribution without larger defects as is exhibited in the known art.

Figure 3:
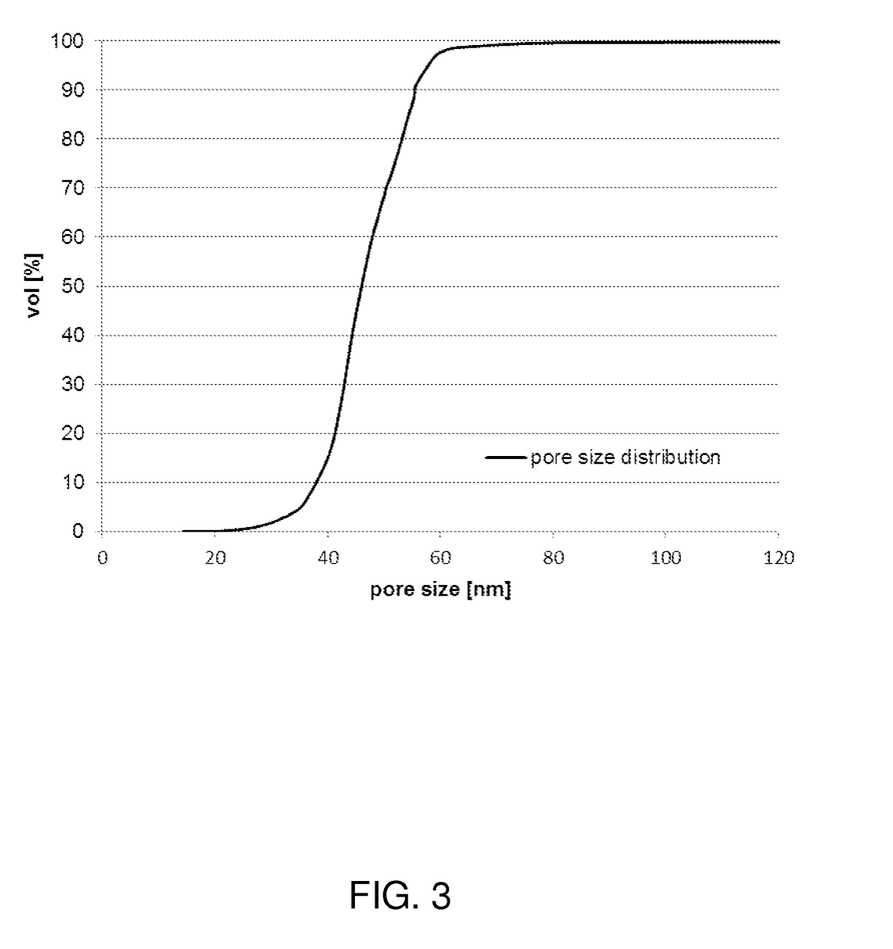
FIG. 3 shows a pore size distribution of nano-porous corundum ceramics prepared with a corundum powder of BET 14.5 m²/g with cold isostatic pressing.

FIG. 3 shows a pore size distribution of corundum ceramics prepared with a cold isostatic pressing process traditionally used in ceramics industry at 750 MPa using a high purity corundum powder with BET 14.5 m2/g. The pressing brings the particles closer together but the pore size distribution is still too broad and the size of larger defects increased to >120 nm.

Figure 4:
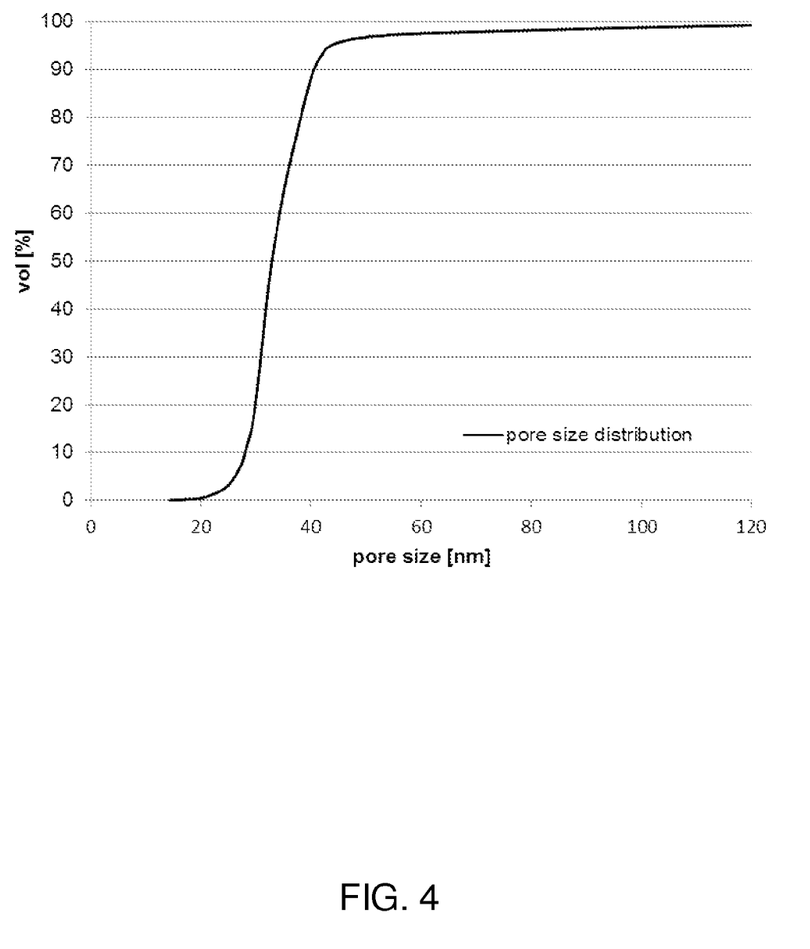
FIG. 4 shows a pore size distribution of nano-porous corundum ceramics prepared with a corundum powder of BET 17.5 m²/g with cold isostatic pressing.

FIG. 4 shows a pore size distribution of corundum ceramics prepared with a cold isostatic pressing process at 750 MPa using a high purity corundum powder with BET 17.5 m2/g. The finer particle size and the pressing bring the particles closer together but the amount of larger pores increased significantly to make this method unsuitable.

Figure 5:
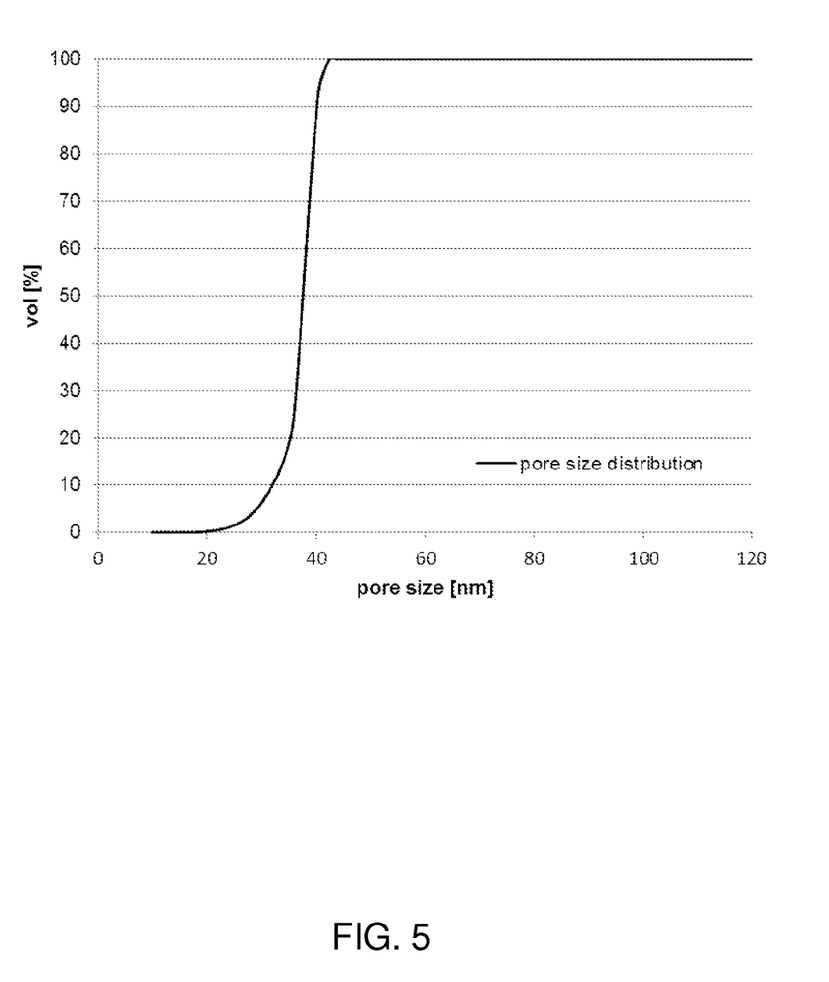
FIG. 5 shows a pore size distribution of nano-porous corundum ceramics prepared with a corundum powder of BET 17.5 m²/g with a liquid shaping process.

FIG. 5 shows a pore size distribution of corundum ceramics according to the invention prepared with a liquid shaping process using a high purity corundum powder with BET 17.5 m$^2$/g. Unexpectedly this ceramic shows a narrow pore size distribution without any larger defects and compared with the ceramics of FIG. 2; the median pore size was reduced from 58 nm to 38 nm.

Table 1, below, shows many of the properties/characteristics of the porous ceramic body in accordance with the present invention.

TABLE 1

CHARACTERISTICS OF POROUS CERAMIC BODY

| | |
|---|---|
| Purity | >99.9% |
| Thickness | 0.5-3.0 cm |
| Porous | yes |
| Coloration | no |
| Powder with Specific BET | yes |
| Deagglomeration | yes |
| Infiltration | no |
| ZrO$_2$ beads allowed | yes |
| Liquid shaping | yes |
| Burn out of organics | yes |

The following are example processes in accordance with different aspects of the present invention. Examples 1-3 are comparative examples with reference to FIG. 2-4. Examples 4-8 demonstrate the processes of the invention. It should be understood that any of the processes provided below are contemplated by the present invention and that the above description should not be considered limiting to the present invention.

Example 1

95.0 g of distilled water in a beaker were placed in an ultrasonic bath at pH 4. The pH value was adjusted with HNO$_3$ and 2 wt % (referring to the mass of the powder) organic binder and 0.8 wt % plasticizer were solved in the slurry. Then 300 g corundum raw powder with purity 99.995% and specific surface area BET of 14.5 g/m$^3$ was added. MgO precursor which forms 0.03 wt % MgO after thermal treatment was also added to the slurry. The slurry was milled with 800 grams of corundum milling beads with purity >99.95% and diameter of about 2 mm in an attrition mill for 2 hours at 1000 rpm. After milling, the beads were separated from the slurry and the slurry was freeze dried. The dried powder was uniaxially pressed to disks with thickness of about 5 mm and diameter of about 25 mm and cold isostatically pressed at 750 MPa. The dried bodies were annealed in air with 0.5 K/min, to 800° C. for 2 hours. The pore size of the received porous ceramic was determined by mercury intrusion method (AutoPore IV 9500, Micromeritics, Norcross, Ga., U.S.A.). FIG. 3 shows the pore size distribution of this comparative example. The porosity was 35.3% and the average pore diameter was 35 nm. About 1% of the pore volume has a size >120 nm and about 1% of the pore volume has a pore size <22 nm. About 0.1 vol % of the pores are larger 400 nm.

Example 2

95.0 g of distilled water in a beaker were placed in an ultrasonic bath at pH 4. The pH value was adjusted with HNO$_3$ and 2 wt % (referring to the mass of the powder) organic binder and 0.8 wt % plasticizer were solved in the slurry. Then 300 g corundum raw powder with purity 99.995% and specific surface area BET of 17.5 g/m$^3$ was added. MgO precursor which forms 0.03 wt % MgO after thermal treatment was also added to the slurry. The slurry was milled with 800 grams of corundum milling beads with purity >99.95% and diameter of about 2 mm in an attrition mill for 2 hours at 1000 rpm. After milling, the beads were separated from the slurry and the slurry was freeze dried. The dried powder was uniaxially pressed to disks with thickness of about 5 mm and diameter of about 25 mm and cold isostatically pressed at 750 MPa. The dried bodies were annealed in air with 0.5 K/min to 800° C. for 2 hours. The pore size of the received porous ceramic was determined by mercury intrusion method (AutoPore IV 9500, Micromeritics, Norcross, Ga., U.S.A.). FIG. 4 shows the pore size distribution of this comparative example. The porosity was 38.2% and the average pore diameter was 53 nm. About 1% of the pore volume has a size >77 nm and about 1% of the pore volume has a pore size <28 nm. About 0.1 vol % of the pores are larger 180 nm.

Example 3

In this experiment, 95.0 g of distilled water in a beaker were placed in an ultrasonic bath at pH 4. The pH was adjusted with HNO₃. Then 300 g corundum raw powder with purity 99.995% and specific surface area BET of 14.5 g/m³ was added. MgO precursor which forms 0.03 wt % MgO after thermal treatment was also added to the slurry. The slurry was milled with 800 grams of corundum milling beads with purity >99.95% and diameter of about 2 mm in an attrition mill for 2 hours at 1000 rpm. After milling, the beads were separated from the slurry and 9 g organic monomer and 3 g crosslinker were solved in the slurry and a starting agent for the free radical polymer chain reaction was added. Then the slurry was casted into glass molds and polymerized under Nitrogen at 60° C. for 4 hours. The gelled bodies with a thickness of about 1 cm were demolded and dried. The dried bodies were annealed in air with 0.5 K/min to 800° C. for 2 hours. The pore size of the received porous ceramic was determined by mercury intrusion method (AutoPore IV 9500, Micromeritics, Norcross, Ga., U.S.A.). FIG. 2 shows the pore size distribution of this comparative example. The porosity was 40.7% and the average pore diameter was 55 nm. No pores >77 nm have been observed and about 1% of the pore volume has a pore size <32 nm.

Example 4

In this experiment, 95.0 g of distilled water in a beaker were placed in an ultrasonic bath at pH 4. The pH was adjusted with HNO₃. Then 300 g corundum raw powder with purity 99.995% and specific surface area BET of 17.5 g/m³ was added. MgO precursor which forms 0.03 wt % MgO after thermal treatment was also added to the slurry. The slurry was milled with 800 grams of corundum milling beads with purity >99.95% and diameter of about 2 mm in an attrition mill for 2 hours at 1000 rpm. After milling, the beads were separated from the slurry and 9 g organic monomer and 3 g crosslinker were solved in the slurry and a starting agent for the free radical polymer chain reaction was added. Then the slurry is casted into glass molds and polymerized under Nitrogen at 60° C. for 4 hours. The gelled bodies with a thickness of about 1 cm were demolded and dried. The dried bodies were annealed in air 0.5 K/min to 800° C. for 2 hours. The pore size of the received porous ceramic was determined by mercury intrusion method (AutoPore IV 9500, Micromeritics, Norcross, Ga., U.S.A.). FIG. 5 shows the pore size distribution of this example according to the invention. The porosity was 38.4% and the average pore diameter was 37 nm. About 1% of the pore volume has a size >42 nm and about 1% of the pore volume has a pore size <23 nm. This inventive solution shows an extremely small pore size distribution with small average pore diameter and no pores larger 44 nm.

Example 5

In this experiment, 95.0 g of distilled water in a beaker were placed in an ultrasonic bath at pH 4. The pH was adjusted with HNO₃. Then 300 g corundum raw powder with purity 99.995% and specific surface area BET of 17.5 g/m³ was added. MgO precursor which forms 0.03 wt % MgO after thermal treatment was also added to the slurry. The slurry was milled with 1000 grams of 3Y—ZrO₂ milling beads with diameter of about 0.5 mm in an attrition mill for 2 hours at 1000 rpm. After milling, the beads were separated from the slurry and 9 g organic monomer and 3 g crosslinker were solved in the slurry and a starting agent for the free radical polymer chain reaction was added. Then the slurry was casted into glass molds and polymerized under Nitrogen at 60° C. for 4 hours. The gelled bodies with a thickness of about 1 cm were demolded and dried. The dried bodies were annealed in air with 2 K/min to 800° C. for 2 hours.

Example 6

In this experiment, 95.0 g of distilled water in a beaker were placed in an ultrasonic bath at pH 4. The pH was adjusted with HNO₃. Then 300 g corundum raw powder with purity 99.995% and specific surface area BET of 17.5 g/m³ was added. MgO precursor which forms 0.03 wt % MgO after thermal treatment was also added to the slurry. The slurry was milled with 800 grams of corundum milling beads with purity >99.95% and diameter of about 2 mm in an attrition mill for 2 hours at 1000 rpm. After milling, the beads were separated from the slurry and 6 g organic monomer and 0.5 g crosslinker were solved in the slurry and a starting agent for the free radical polymer chain reaction was added. Then the slurry was casted into glass molds and polymerized under Nitrogen at 60° C. for 4 hours. The gelled bodies with a thickness of about 1 cm were demolded and dried. The dried bodies were annealed in air 0.5 K/min to 800° C. for 2 hours.

Example 7

In this experiment, 95.0 g of distilled water in a beaker were placed in an ultrasonic bath at pH 4. The pH was adjusted with HNO₃. Then 300 g corundum raw powder with purity 99.995% and specific surface area BET of 17.5 g/m³ was added. The slurry was milled with 800 grams of corundum milling beads with purity >99.95% and diameter of about 2 mm in an attrition mill for 2 hours at 1000 rpm. After milling, the beads were separated from the slurry and 9 g organic monomer and 3 g crosslinker were solved in the slurry and a starting agent for the free radical polymer chain reaction was added. Then the slurry is casted into glass molds and polymerized under Nitrogen at 60° C. for 4 hours. The gelled bodies with a thickness of about 1 cm were demolded and dried. The dried bodies were heated with 0.5 K/min to 800° C. for 2 hours.

Example 8

In this experiment, 95.0 g of distilled water in a beaker were placed in an ultrasonic bath at pH 4. The pH was adjusted with HNO₃. Then 300 g corundum raw powder with purity 99.995% and specific surface area BET of 17.5 g/m³ was added. The slurry was milled with 800 grams of corundum milling beads with purity >99.95% and diameter of about 2 mm in an attrition mill for 2 hours at 1000 rpm. After milling the beads were separated from the slurry and 9 g organic monomer and 3 g crosslinker were solved in the slurry and a starting agent for the free radical polymer chain reaction was added. Then the slurry is casted into glass molds and polymerized under Nitrogen at 60° C. for 4 hours. The gelled bodies with a thickness of about 3 cm were demolded and dried. The dried bodies were heated with 0.5 K/min to 800° C. for 2 hours.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method of forming nano-porous corundum ceramics, comprising:
   milling corundum powder in an aqueous slurry with beads;
   processing the slurry by a liquid shaping process to form a gelled body; and
   sintering the gelled body between 600° C. to 1000° C.,
   wherein the liquid shaping process comprises:
     placing slurry molds in a vacuum furnace with vacuuming air inside;
     inserting nitrogen gas into the vacuum furnace until a pressure higher than an initial pressure is reached;
     vacuuming the nitrogen gas;
     filling the vacuum furnace again with the nitrogen gas; and
     adjusting the temperature.

2. The method of claim 1, wherein the corundum powder has a BET of 14-24 $m^2/g$.

3. The method of claim 2, wherein the corundum powder has a BET of 17-21 $m^2/g$.

4. The method of claim 1, wherein the beads are sintered corundum beads with sub-µm grain size.

5. The method of claim 1, wherein the beads are one of corundum beads and $ZrO_2$ beads with 3 mol % $Y_2O_3$.

6. The method of claim 5, wherein the slurry is aqueous slurry comprising distilled water and a stabilizing agent for corundum powder particles.

7. The method of claim 6, further comprising adding a gelling agent after milling.

8. The method of claim 1, wherein the sintering has a final temperature of about 800° C. for a hold time between about 0 hours and 8 hours.

9. The method of claim 8, wherein the sintering of the gelled body is in air, oxygen or mixtures of inert gasses with oxygen.

10. The method of claim 8, wherein the corundum powder has a purity of >99.9% and the beads are corundum milling beads with purity >99.9%.

11. The method of claim 10, wherein the corundum powder has a purity of 99.995% and the beads are corundum milling beads with purity >99.95%.

12. A method of forming nano-porous corundum ceramics, comprising:
    milling corundum powder in an aqueous slurry with beads;
    processing the slurry by a liquid shaping process to form a celled body; and
    sintering the gelled body between 600° C. to 1000° C.,
    wherein the liquid shaping process comprises:
      placing slurry molds in a vacuum furnace with vacuuming air inside;
      inserting, nitrogen gas into the vacuum furnace until a pressure higher than an initial pressure is reached; and
      vacuuming the nitrogen gas,
    wherein the liquid shaping process further comprises using an ultrasonic bath,
    wherein the placing the slurry molds in the vacuum furnace comprises placing the slurry molds in the vacuum furnace at about 20-25° C. with the vacuuming air inside until a vacuum at least 50 mbar above a boiling point of the slurry is reached,
    wherein the inserting the nitrogen gas comprises inserting the nitrogen gas into the vacuum furnace until the vacuum furnace reaches atmospheric pressure,
    wherein the vacuuming the nitrogen gas comprises vacuuming the nitrogen gas until a vacuum at least 50 mbar above the boiling point of the slurry is reached,
    wherein the inserting the nitrogen gas and the vacuuming the nitrogen gas is repeated, and
    wherein the liquid shaping process further comprises:
      filling the vacuum furnace again with the nitrogen gas;
      increasing the temperature to about 40° C. to 80° C. for 0-8 hours; and
      reducing the temperature to about 20-25° C.

13. A method comprising:
    milling corundum powder with BET of 17-21 $m^2/g$ in an aqueous slurry with beads, the aqueous slurry being distilled water and $HNO_3$ for stabilizing a pH of the corundum powder between 3.5 and 4.5;
    processing the aqueous slurry by a liquid shaping process to form a gelled body; and
    sintering the gelled body in air at a temperature between 800° C. to 900° C.,
    wherein the liquid shaping process comprises:
      placing slurry molds in a vacuum furnace with vacuuming air inside;
      inserting nitrogen gas into the vacuum furnace until it reaches a pressure higher than an initial pressure;
      vacuuming the nitrogen gas;
      filling the vacuum furnace again with the nitrogen gas; and
      adjusting the temperature.

14. The method of claim 13, wherein the beads are sintered corundum beads with sub-µm grain size.

15. The method of claim 13, wherein the beads are $ZrO_2$ beads with 3 mol % $Y_2O_3$.

16. The method of claim 13, wherein a sintering aid of MgO or a MgO precursor comprising <0.05 wt % MgO is added to the slurry.

17. The method of claim 13, wherein the corundum powder has a purity of >99.9% and the beads are corundum milling beads with purity >99.9%.

18. The method of claim 13, wherein a final temperature of the sintering is about 800° C. with a hold time of about 2 hours.

* * * * *